US012067289B2

(12) United States Patent
Sharma et al.

(10) Patent No.: US 12,067,289 B2
(45) Date of Patent: Aug. 20, 2024

(54) DATA STORAGE DEVICE AND METHOD FOR MEMORY-DIE-STATE-AWARE HOST COMMAND SUBMISSION

(71) Applicant: Western Digital Technologies, Inc., San Jose, CA (US)

(72) Inventors: Amit Sharma, Bengaluru (IN); Dinesh Kumar Agarwal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 103 days.

(21) Appl. No.: 17/571,841

(22) Filed: Jan. 10, 2022

(65) Prior Publication Data

US 2023/0221888 A1 Jul. 13, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061
See application file for complete search history.

(56) References Cited

U.S. PATENT DOCUMENTS

| | | | |
|---|---|---|---|
| 9,135,192 B2 | 9/2015 | Lin et al. | |
| 9,400,749 B1 | 7/2016 | Kuzmin et al. | |
| 9,824,004 B2 | 11/2017 | Mirichigni et al. | |
| 10,108,372 B2 | 10/2018 | D'Eliseo et al. | |
| 11,586,385 B1 * | 2/2023 | Lercari | G06F 12/0246 |
| 11,681,614 B1 * | 6/2023 | Kuzmin | G06F 3/0638 710/301 |
| 2007/0067603 A1 * | 3/2007 | Yamamoto | G06F 12/0246 711/E12.008 |
| 2008/0162735 A1 | 7/2008 | Voigt et al. | |
| 2016/0292092 A1 * | 10/2016 | Gavens | G06F 3/0629 |
| 2019/0102110 A1 * | 4/2019 | Shaharabany | G06F 3/0688 |
| 2019/0324690 A1 * | 10/2019 | Jin | G06F 3/0611 |
| 2020/0057715 A1 * | 2/2020 | Benisty | G06F 12/0246 |
| 2020/0081828 A1 * | 3/2020 | Chen | G06F 3/0616 |
| 2021/0397365 A1 * | 12/2021 | Kim | G06F 3/0611 |
| 2022/0083274 A1 * | 3/2022 | Cho | G06F 3/064 |
| 2022/0283961 A1 * | 9/2022 | Kim | G06F 9/546 |
| 2022/0404999 A1 * | 12/2022 | Rajagopalan | G06F 11/3034 |

(Continued)

OTHER PUBLICATIONS

International Search Report mailed Sep. 13, 2022 for International Application No. PCT/US2022/029740.

(Continued)

*Primary Examiner* — Michelle T Bechtold
*Assistant Examiner* — Tong B. Vo
(74) *Attorney, Agent, or Firm* — Crowell & Moring LLP

(57) ABSTRACT

A data storage device and method for memory-die-state-aware host command submission are provided. In one embodiment, a data storage device comprises a memory comprising a plurality of memory dies and a controller. The controller is configured to receive a query from a host for a status of a memory die that will be accessed by a command; determine the status of the memory die; and respond to the query by providing the status of the memory die to the host. Other embodiments are possible, and each of the embodiments can be used alone or together in combination.

19 Claims, 11 Drawing Sheets

(56) References Cited

U.S. PATENT DOCUMENTS

2022/0405200 A1\* 12/2022 Karr .................. G06F 3/067
2023/0170002 A1\* 6/2023 Lee ................... G11C 7/1069
　　　　　　　　　　　　　　　　　　　　365/191

OTHER PUBLICATIONS

Written Opinion mailed Sep. 13, 2022 for International Application No. PCT/US2022/029740.
Search Strategy completed Aug. 31, 2022 for International Application No. PCT/US2022/029740.

\* cited by examiner

DATA STORAGE DEVICE AND METHOD FOR MEMORY-DIE-STATE-AWARE HOST COMMAND SUBMISSION

BACKGROUND

Data storage devices can be used to store data received from a host. In some data storage devices, the memory (e.g., NAND) is organized into smaller storage subunits called memory dies. The storage capacity of data storage devices is increasing rapidly. With increasing storage capacity, the number of memory dies is also increasing.

DETAILED DESCRIPTION

Overview

Figure 1A:
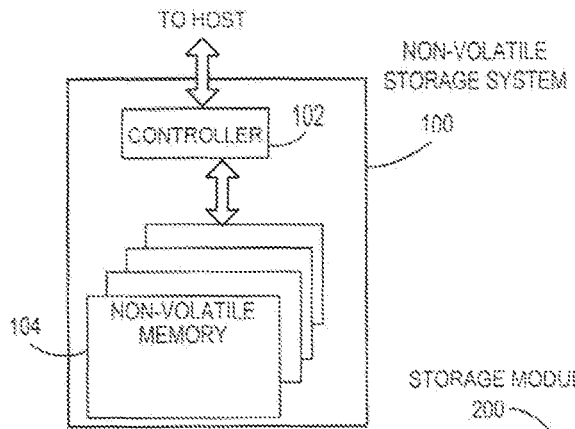
FIG. 1A is a block diagram of a data storage device of an embodiment.

By way of introduction, the below embodiments relate to a data storage device and method for memory-die-state-aware host command submission. In one embodiment, a data storage device is provided comprising a memory comprising a plurality of dies and a controller. The controller is configured to receive a query from a host for a status of a memory die that will be accessed by a command; determine the status of the memory die; and respond to the query by providing the status of the memory die to the host.

In some embodiments, the query alone does not cause the command to be placed in a command queue in the data storage device for execution.

In some embodiments, the status of the memory die indicates that the memory die is not busy, and wherein the controller is further configured to receive an instruction from the host to place the command in a command queue in the data storage device for execution.

In some embodiments, the status of the memory die indicates that the memory die is busy, and the controller is further configured to receive a second query from the host for a status of a memory die that will be accessed by a second command.

In some embodiments, the query is received in a vendor-specific command.

In some embodiments, the plurality of memory dies are configured with processing capabilities.

In some embodiments, the controller is further configured to shuffle pending operations in the data storage device based on the status of the memory die.

In some embodiments, the controller is further configured to split a single command into multiple commands based on the status of the memory die.

In some embodiments, the memory comprises a three-dimensional memory.

In another embodiment, a method is provided that is performed in a host in communication with a data storage device comprising a memory comprising a plurality of memory dies. The method comprises sending a request to the data storage device for a storage location of a logical-to-physical address translation map that includes a memory die ready/busy status for each physical address in the logical-to-physical address translation map; querying the logical-to-physical address translation map to determine the memory die ready/busy statuses associated with logical addresses of a plurality of commands; and using the memory die ready/busy statuses to prioritize the plurality of commands.

In some embodiments, the storage location is in a host memory buffer in the host.

In some embodiments, the storage location is in a controller memory buffer in the data storage device.

In some embodiments, the request is sent in a vendor-specific command.

In some embodiments, prioritizing the plurality of commands comprises selecting at least one, but not all, of the plurality of commands to send to the data storage device for execution, wherein the selected command(s) are associated with memory die(s) that are not busy.

In some embodiments, the method further comprises, prior to sending the request, inquiring whether the data storage device is configured to share the logical-to-physical address translation map.

In some embodiments, the method further comprises shuffling pending operations in the data storage device based on the memory die ready/busy statuses.

In some embodiments, the method further comprises splitting a single command into multiple commands based on the memory die ready/busy statuses.

In some embodiments, the method further comprises negotiating the storage location with the data storage device.

In some embodiments, the plurality of memory dies are configured with processing capabilities.

In another embodiment, a data storage device is provided comprising a memory comprising a plurality of memory dies and means for providing a host with a status of at least one of the plurality of memory dies prior to receiving an instruction from the host to queue a command for execution in the at least one of the plurality of memory dies.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
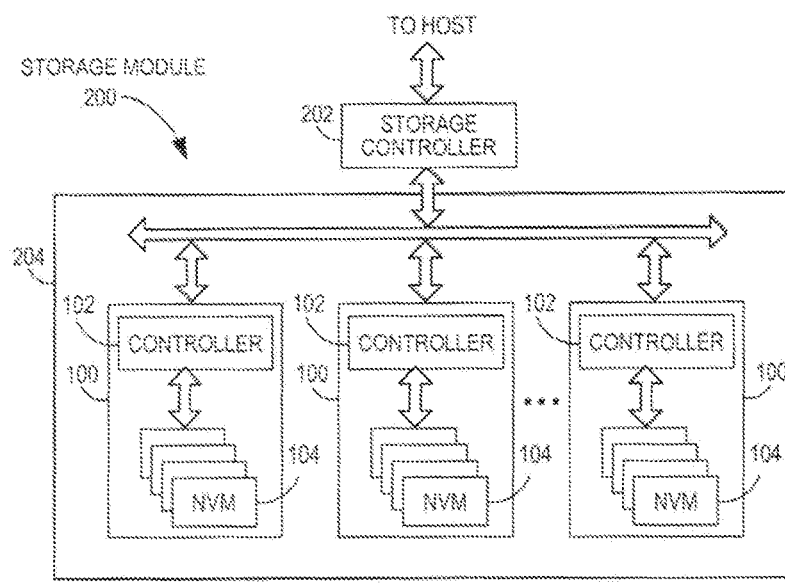
FIG. 1B is a block diagram illustrating a storage module of an embodiment.
Figure 1C:
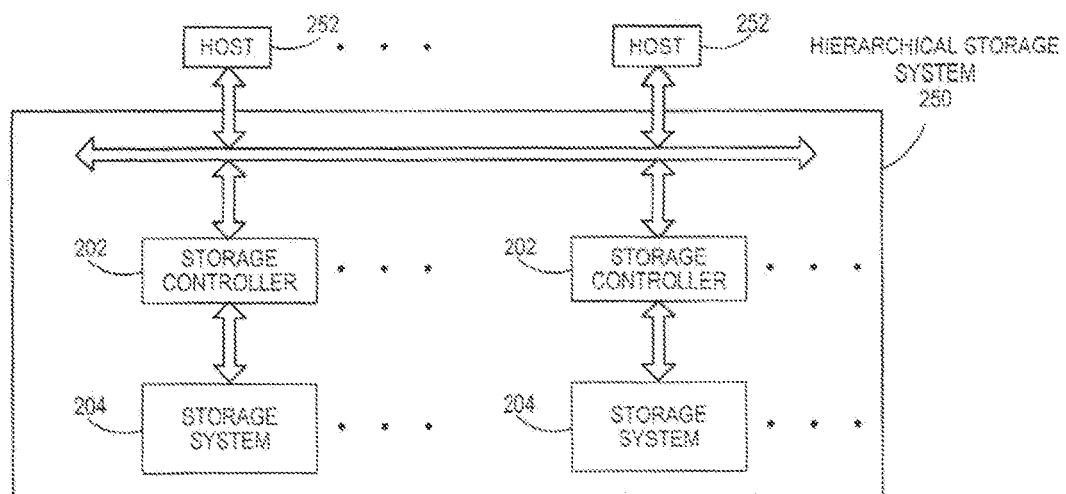
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
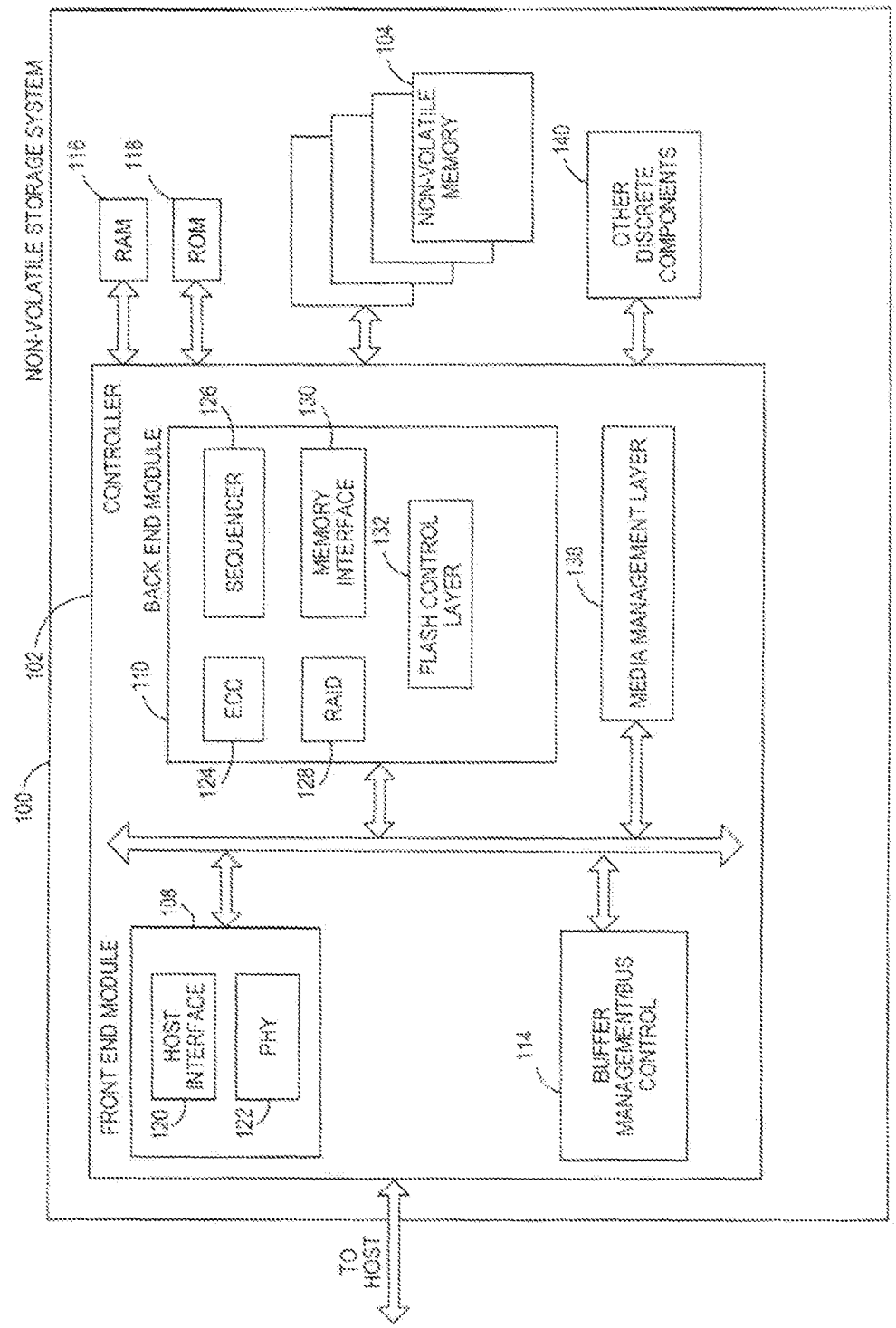
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
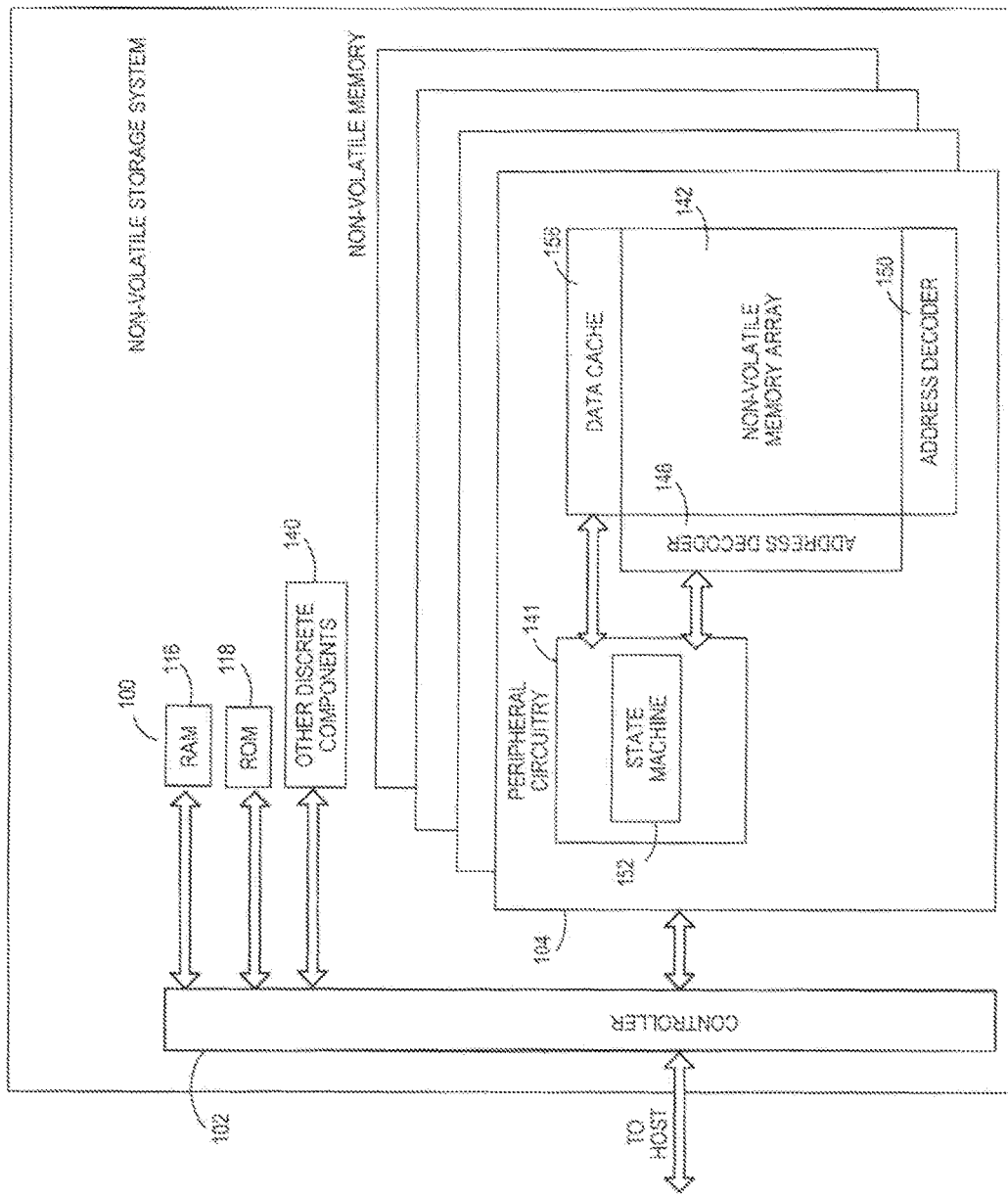
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
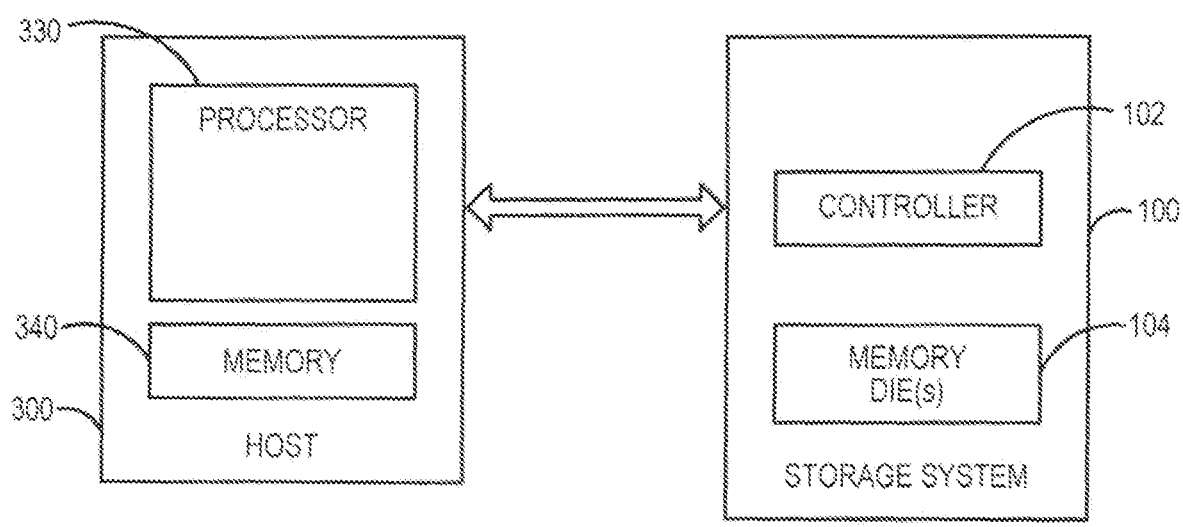
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, the storage capacity of data storage devices is increasing rapidly. With increasing storage capacity, the number of memory dies is also increasing. If an incoming host command is trying to access a memory die that is busy with a previous operation, that command will need to wait until that previous operation finishes and the memory die is free. This is illustrated in FIG. 4.

Figure 4:
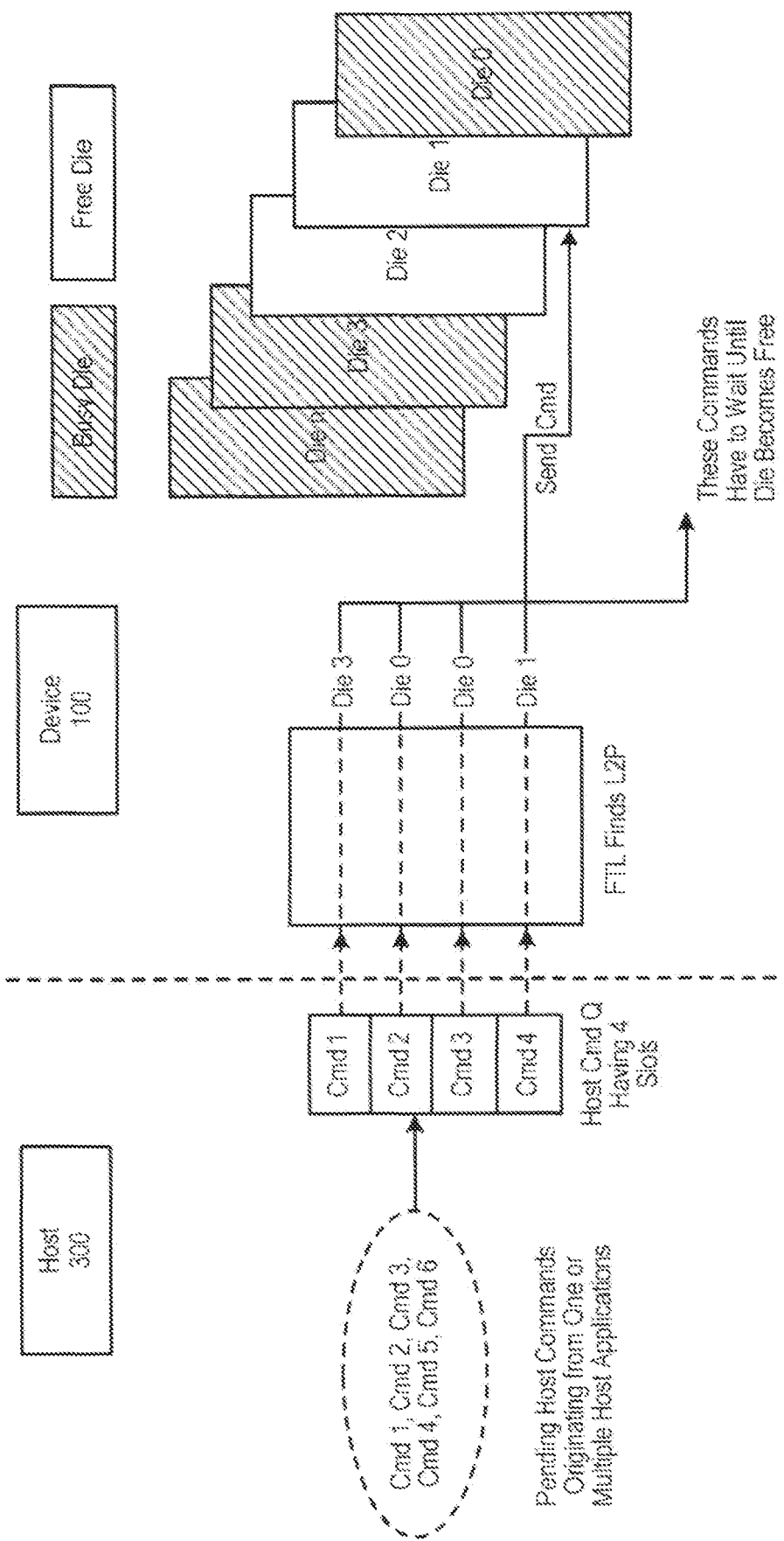
FIG. 4 is a diagram illustrating a host queuing a command to a data storage device of an embodiment.

As shown in FIG. 4, the host 300 has a command queue with four command slots to store commands from various applications running on the host 300. When the commands are sent to the data storage device 100, the flash translation layer (FTL) (e.g., implemented by the controller 102) uses a logical-to-physical address translation table to identify the physical address associated with the logical address in each command. In the example shown in FIG. 4, two commands map to Die 0, one command maps to Die 1, and one command maps to Die 3. In this example, Dies 1 and 2 are free, while Dies 0, 3, and 4 are busy. So, the command to Die 1 is serviced right away (because Die 1 is free), and the commands to Dies 0 and 3 will need to wait until those dies are available. How long a die will remain busy/unavailable can depend on the type of operation being performed in the die. For example, erase and program operations generally take more time than a read operation. Also, if a die is moving a physical block to another place due to fragmentation or device exception handing (device internal error recovery and corrective mechanism) or is performing a time-consuming compute operation, the die can be unavailable for an extended period of time.

Several problems can occur if a command needs to wait until its memory die is free, as the host 300 and the data storage device 100 spend central processing unit (CPU) bandwidth to prepare commands. For example, a host command queue slot may need to be reserved for longer duration, which can be problematic if the number of host command slots are limited, such as in a low-cost host. For example, SATA and USB protocols only have 32 command slots. Also, many cost-savvy hosts further chose to utilize an even-smaller host queue depth to forego allocating resources for pending commands. Reserving a command slot that does not get picked due to die busyness can reduce overall device utilization/performance. As another example, even if the host 300 has a sufficient host command queue depth (e.g., PCIe), data storage devices can be shared among multiple types of applications/users that generate different loads for different dies. Preparing, queueing, and processing these commands can consume critical processing power of both the host 300 and the data storage device 100. A low quality of service can result if these commands do not get picked due to die busyness.

The following embodiments address these problems by allowing the host 300 to consider the die state while selecting/prioritizing pending operations. This enables higher device (die) utilization and effective usage of the host input-output bus, thereby increasing overall system performance. As will be discussed in more detail below, in one embodiment, the host 300 is made aware of the states of the memory dies, so the host 300 can prioritize pending commands (i.e., based on information about the states of the memory dies, the host 300 can give preference to command(s) that would be directed to the die(s) that are free).

The host 300 can be made aware of the states of the memory dies in any suitable way. In one embodiment, a host-device handshake is used (a vendor-specific command can be used for the handshake). In this embodiment, the host 300 queries the data storage device 100 to determine if the next command that the host 300 plans on sending to the data storage device 100 will be directed to a memory die that is already in use. The controller 102 of the data storage device 100 would find out that information and respond back to the host 300, and the host 300 can consider this information in deciding whether to send the command or another command. If the host 300 decides to send another command, the host 300 can query the data storage system 100 in the same manner about that other command. This host-device handshake approach is shown in FIG. 5.

Figure 5:
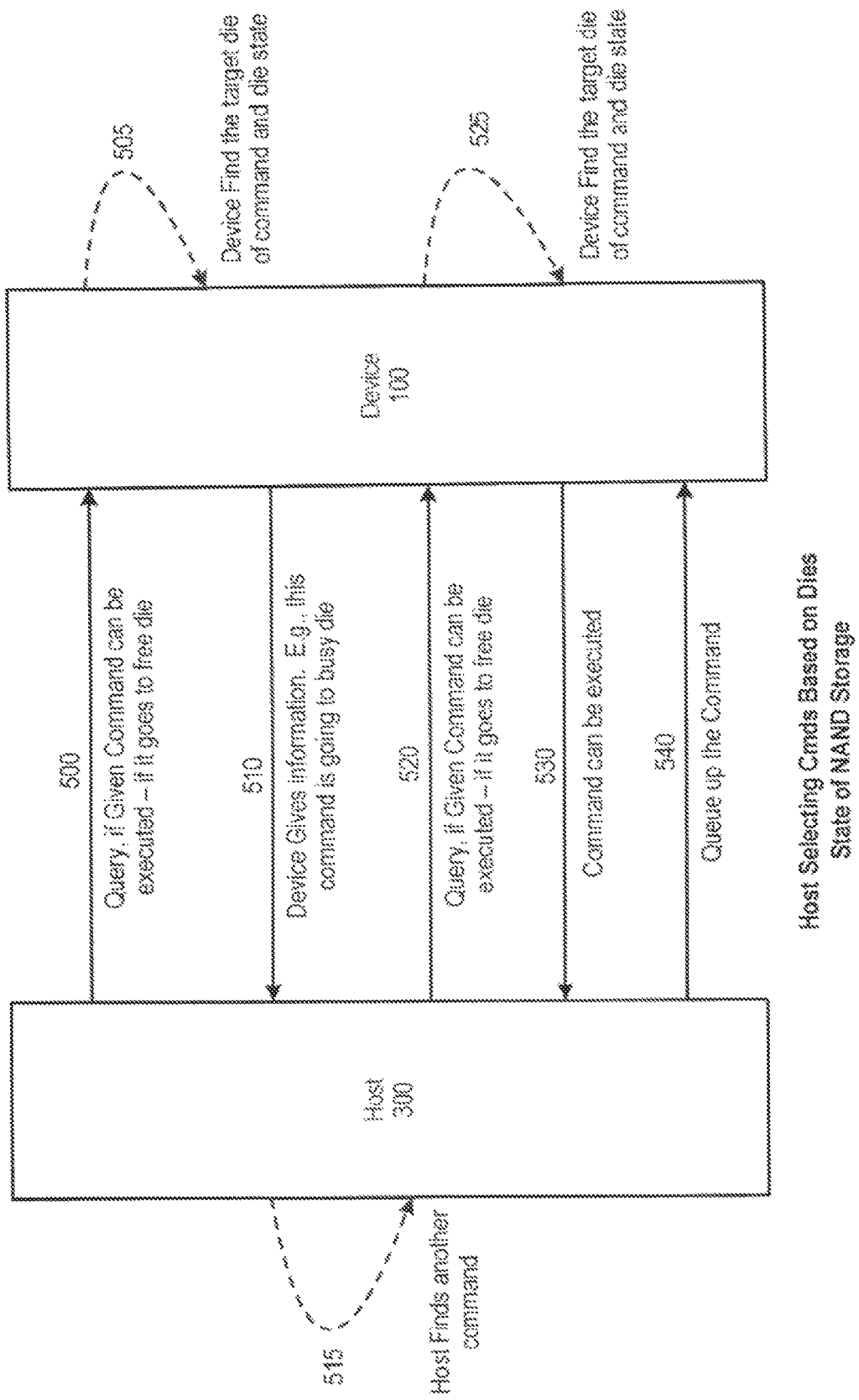
FIG. 5 is a diagram illustrating a host selecting commands based on states of memory dies in a data storage device of an embodiment.

As shown in FIG. 5, the host 300 sends a query to the data storage device 100 regarding whether a given command, if executed, will go to a free memory die (act 500). The controller 102 finds the target die of the command and the state of that die (act 505) and provides the state information to the host 300 (act 510). Here, the die is busy, so the host 300 selects another command (act 515), and the query and response process repeats (act 520, 525, and 530). This time, the memory die is free, so the host 300 queues up the command for execution (act 540).

In another embodiment, the host 300 is made aware of the states of the memory dies by the data storage device 100 publishing a die compute state and logical-block-address-to-die mapping to the host 300. This sharing can be done by using a host memory buffer in the host 300 or by using a controller memory buffer in the controller 102, for example. During boot-up, the host 300 can ask the data storage device 100 if this information can be provided to the host 300, and the data storage device 100 can reply back with a response. Subsequently, a shared information location can be negotiated between the data storage device 100 and the host 300. This "publishing" approach is shown in FIG. 6.

Figure 6:
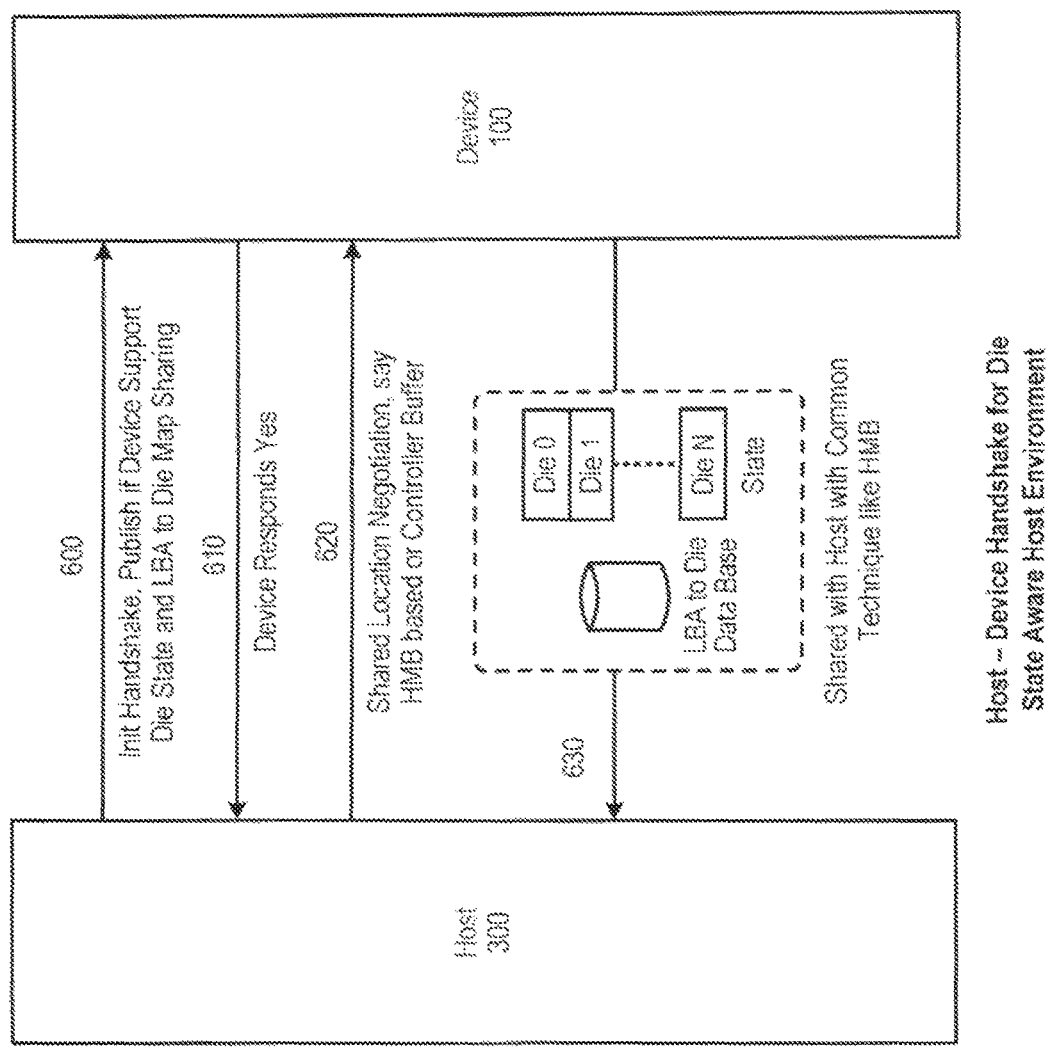
FIG. 6 is a diagram illustrating a host-device handshake for a die-state-aware host environment of an embodiment.

As shown in FIG. 6, the host 300 initiates a handshake (a vendor-specific command can be used for the handshake) to see if the data storage device 100 supports this "publishing" approach (act 600). If the data storage device 100 responds "yes" (act 610), the host 300 initiates a shared location negotiation to determine where the information will be stored (e.g., in a host memory buffer (HMB) or a controller memory buffer (CMB)) (act 620). The controller 102 in the data storage device 100 then shares the logical-to-physical address translation/die state information with the host 300 at the agreed-upon location (act 630).

Figure 7:
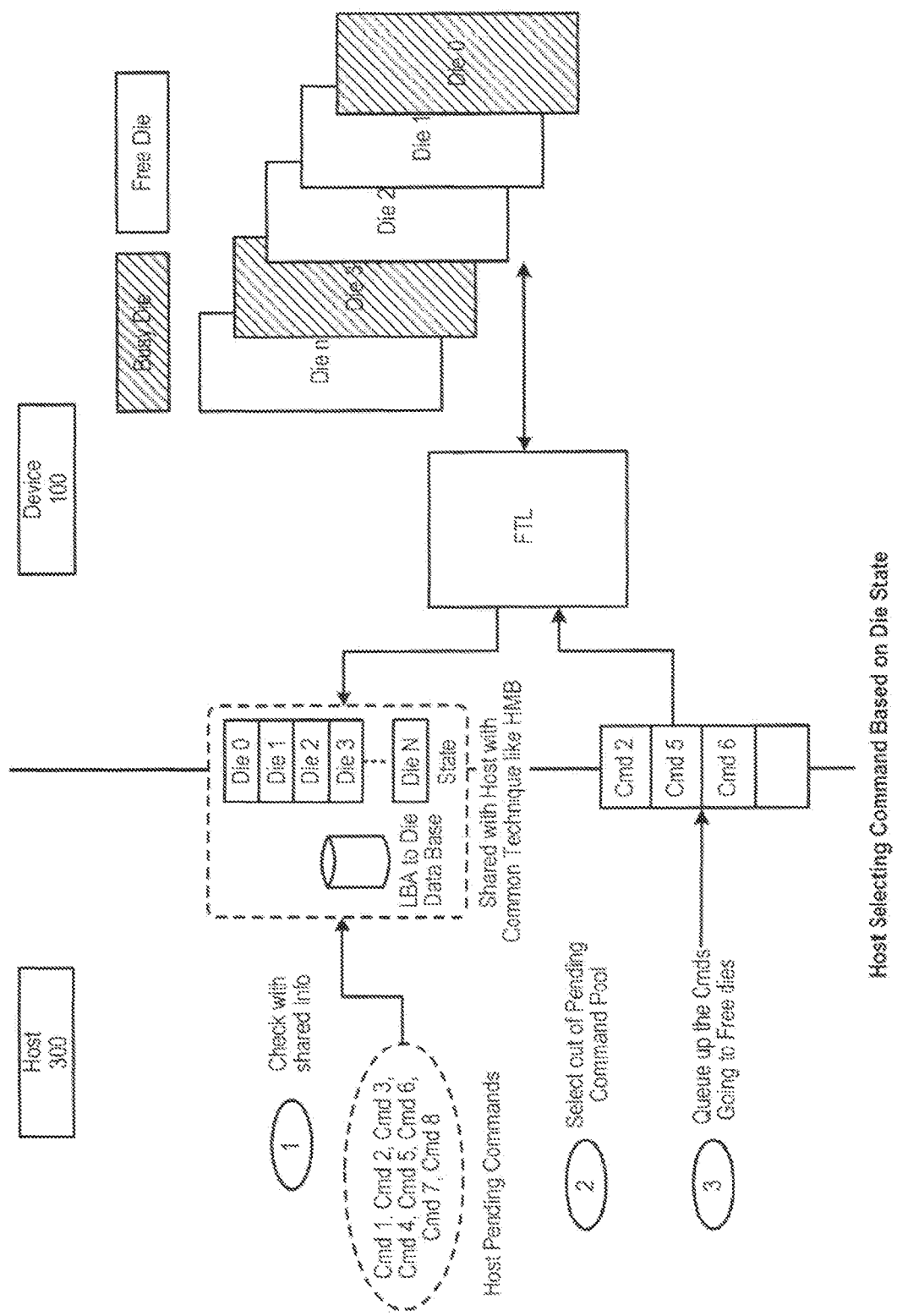
FIG. 7 is a diagram illustrating a host selecting a command based on a state of a memory die in a data storage device of an embodiment.
Figure 8:
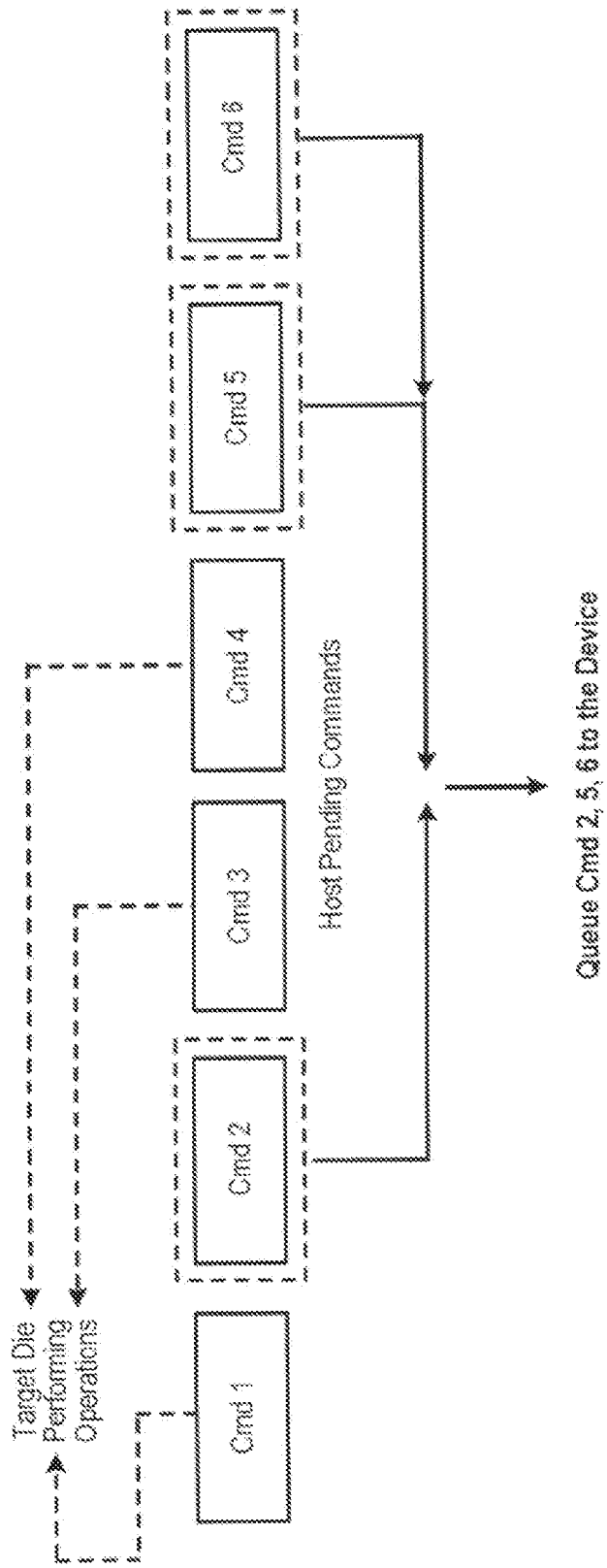
FIG. 8 is a diagram illustrating a queuing operation of an embodiment.

Once the information about target die and die state is available, the host 300 can make use of that information to queue up command(s) going to free die(s). For example, as shown in FIG. 7, the shared information shows that Dies 0 and 3 are busy. So, the host 300 can queue up commands (Commands 2, 5, and 5) going to the other dies that are free. As another example, FIG. 8 shows that the host 300 wants to execute Commands 1 to 6; however, Commands 1, 3, and 4 are targeted to memory dies that are busy with pending operations. So, the host 300 queues Commands 2, 5, and 6 to the data storage device 100. Finding commands that can be executed right away can improve quality of service, as delaying these commands can reduce performance (e.g., delaying a write command means that the associated data in the RAM buffer cannot be evicted, thereby reducing the storage capacity of the RAM buffer for other operations).

Figure 9:
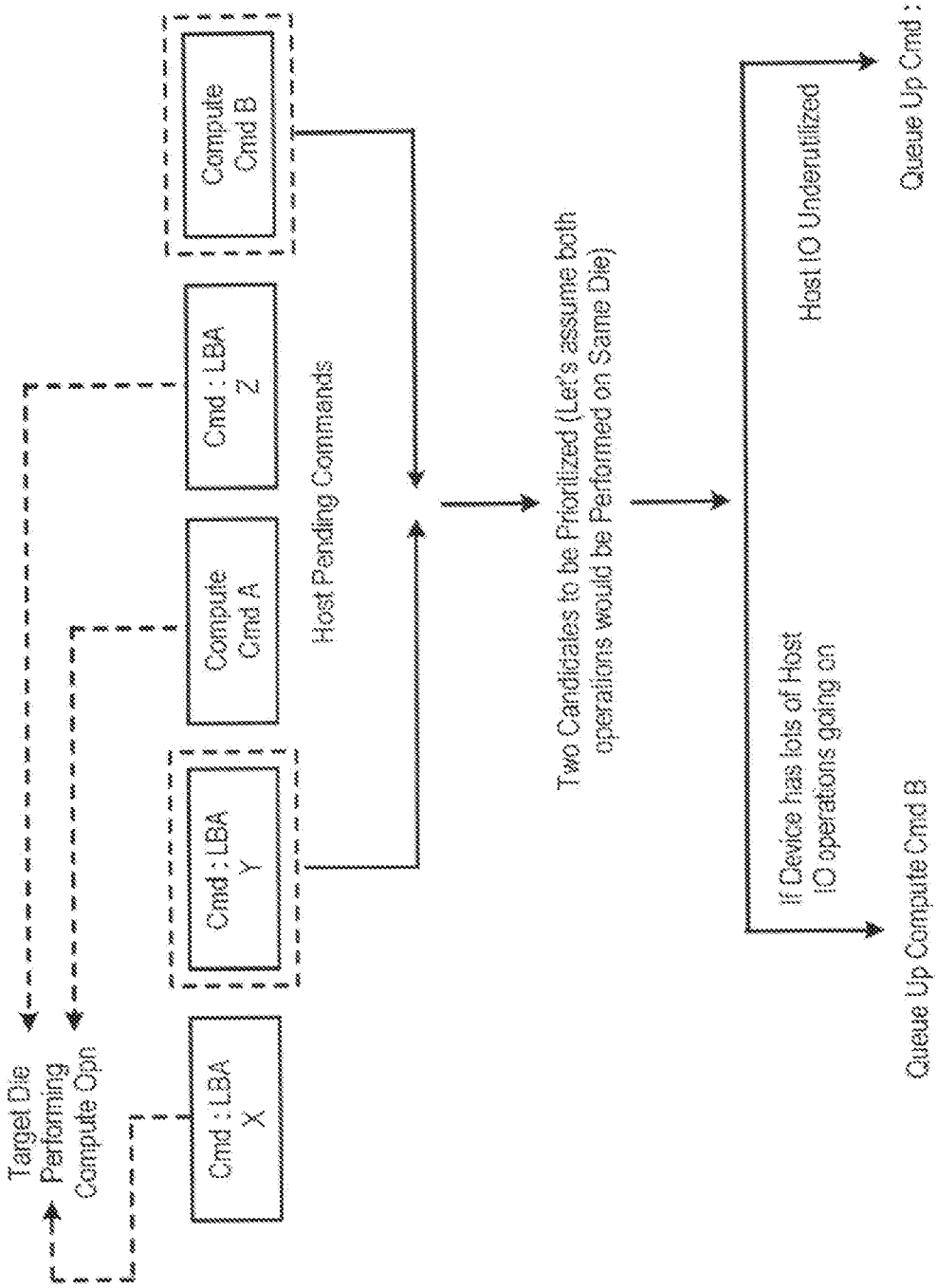
FIG. 9 is a diagram illustrating a command shuffling operation of an embodiment.

In another embodiment, the data storage device 100 is used as a compute storage device, where NAND dies (CMOS-bonded array (CBA)-based NAND) can have processing capability. Compute operations can make dies busy for longer durations of time (e.g., a die can be performing search operations on multiple blocks). If multiple dies are performing computations, other critical resources (e.g., host input-output bus bandwidth) can be underutilized. In this case, based on this scheme, the host 300 can reshuffle pending operations to utilize both the host input-output bus and memory dies in a more-optimal manner. This is illustrated in FIG. 9.

Figure 10:
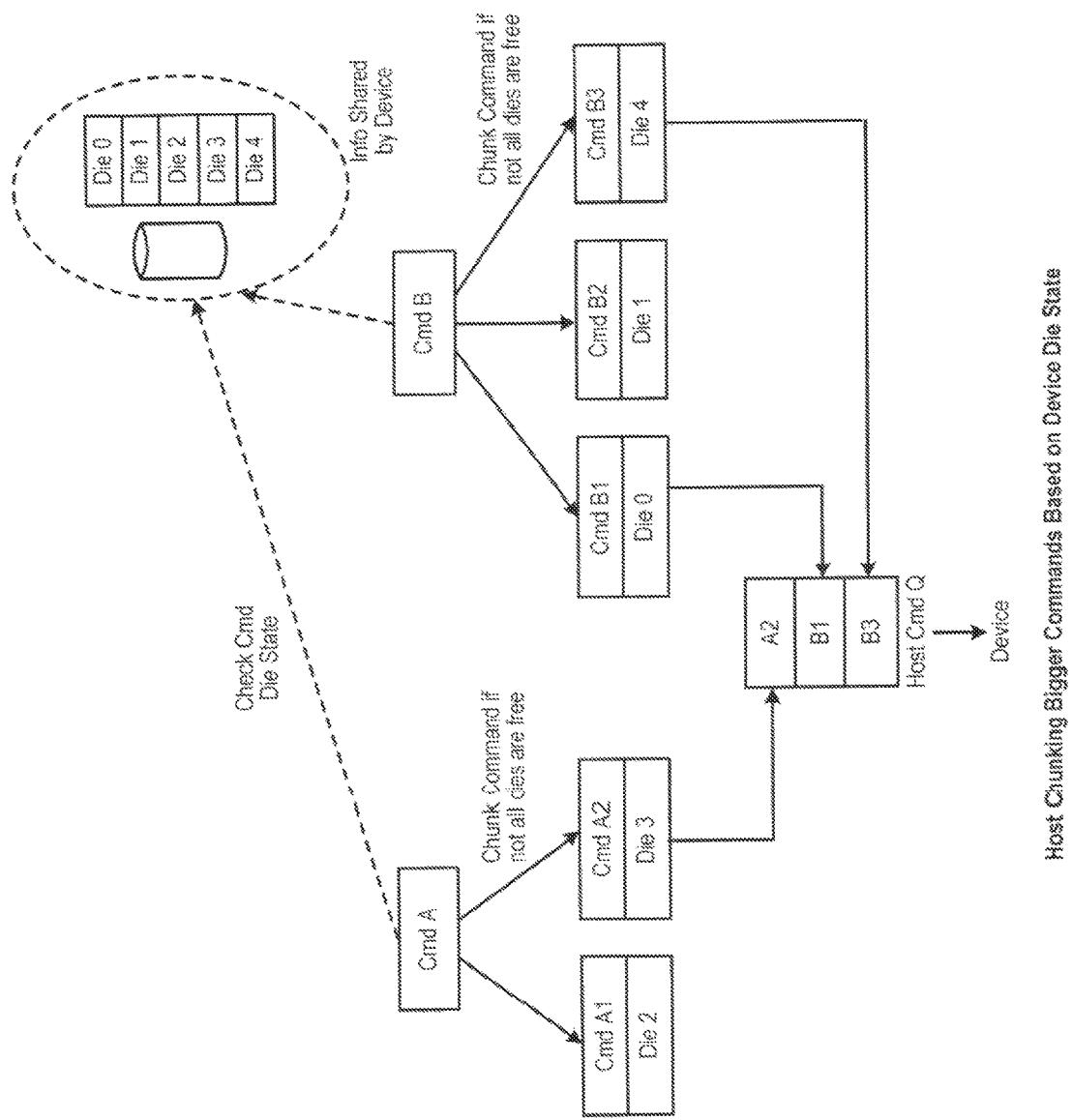
FIG. 10 is a diagram illustrating a host selecting a command size based on a state of a memory die in a data storage device of an embodiment.

In another embodiment, bigger host commands can be split to effectively utilize the limited resources of the host 300 and data storage device 100. This is illustrated in FIG. 10. As shown in FIG. 10, although Command A and Command B as a whole are busy, the host 300 can further check the die state of smaller chunks of the commands. In this way, smaller fragments of the commands can be queued up to the data storage device 100, which would effectively better utilize the host input-output buss and the data storage device 100.

There are several advantages associated with these embodiments. For example, these embodiments can provide higher performance in a low-queue-depth environment. That is, there embodiment can be used to increase host queue utilization (and, hence, device utilization). This may be especially advantageous in cost-constrained hosts where the host does not have enough resources to implement a high queue depth (e.g., in low-cost hosts implementing SATA, USB, or SD protocols, where queue depth is relatively low). Another advantage is that these embodiments can provide higher performance in compute storage where certain dies can be busy performing search operations, for example. In these kinds of environments, the host 300 can effectively schedule compute/regular operations based on the die state.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of memory dies; and a controller configured to: receive a request from a host for a storage location of a logical-to-physical address translation map that includes a memory die ready/busy status for each physical address in the logical-to-physical address translation map, wherein a busy status for one of the plurality of memory dies indicates that the one of the plurality of memory dies is busy with an ongoing memory operation and that a new memory operation to the memory die will be delayed until after the ongoing memory operation is completed;
respond to the request by providing the storage location of the logical-to-physical address translation map to the host; and
receive a command from the host to perform a memory operation on a logical address that translates, in the logical-to-physical address translation map, to a physical address in one of the plurality of memory dies that is indicated to be ready, wherein the command is selected by the host after the host accesses the logical-to-physical address translation map at the storage location to determine that the one of the plurality of memory dies is indicated to be ready.

2. The data storage device of claim 1, wherein the request alone does not cause the command to be placed in a command queue in the data storage device for execution.

3. The data storage device of claim 1, wherein the controller is further configured to receive a second request from the host for the storage location of the logical-to-physical address translation map.

4. The data storage device of claim 1, wherein the controller is further configured to receive the request in a vendor-specific command.

5. The data storage device of claim 1, wherein the plurality of memory dies is configured with processing capabilities.

6. The data storage device of claim 1, wherein the controller is further configured to reorder pending operations in the data storage device.

7. The data storage device of claim 1, wherein the controller is further configured to split a single command into multiple commands.

8. The data storage device of claim 1, wherein the memory comprises a three-dimensional memory.

9. A method comprising:
performing the following in a host in communication with a data storage device comprising a memory comprising a plurality of memory dies:
sending a request to the data storage device for a storage location of a logical-to-physical address translation map that includes a memory die ready/busy status for each physical address in the logical-to-physical address translation map, wherein a busy status for one of the plurality of memory dies indicates that the one of the plurality of memory dies is busy with an ongoing memory operation and that a new memory operation to the memory die will be delayed until after the ongoing memory operation is completed;
accessing the logical-to-physical address translation map;
selecting, from a plurality of commands, a command comprising a logical address that translates, in the logical-to-physical address translation map, to a physical address in one of the plurality of memory dies that is indicated to be ready; and
sending the command to the data storage device.

10. The method of claim 9, wherein the storage location is in a host memory buffer in the host.

11. The method of claim 9, wherein the storage location is in a controller memory buffer in the data storage device.

12. The method of claim 9, wherein the request is sent in a vendor-specific command.

13. The method of claim 9, further comprising, prior to sending the request, inquiring whether the data storage device is configured to share the logical-to-physical address translation map.

14. The method of claim 9, further comprising reordering pending operations in the data storage device.

15. The method of claim 9, further comprising splitting a single command into multiple commands.

16. The method of claim 9, further comprising negotiating the storage location with the data storage device.

17. The method of claim 9, wherein the plurality of memory dies is configured with processing capabilities.

18. The method of claim 9, wherein the plurality of commands comprises read commands and/or write commands.

19. A data storage device comprising:
a memory comprising a plurality of memory dies;
means for providing a host with a storage location of a logical-to-physical address translation map that includes a memory die ready/busy status for each physical address in the logical-to-physical address translation map, wherein a busy status for one of the plurality of memory dies indicates that the one of the plurality of memory dies is busy with an ongoing memory operation and that a new memory operation to the memory die will be delayed until after the ongoing memory operation is completed; and
means for receiving a command from the host to perform a memory operation on a logical address that translates, in the logical-to-physical address translation map, to a physical address in one of the plurality of memory dies that is indicated to be ready, wherein the command is selected by the host after the host accesses the logical-to-physical address translation map at the storage location to determine that the one of the plurality of memory dies is indicated to be ready.

* * * * *